(12) United States Patent
Trudel et al.

(10) Patent No.: US 12,099,719 B2
(45) Date of Patent: Sep. 24, 2024

(54) CLUSTER MANAGEMENT IN LARGE-SCALE STORAGE SYSTEMS

(71) Applicant: Dell Products L.P., Round Rock, TX (US)

(72) Inventors: Christopher Trudel, Florence, TX (US); Maunish A. Shah, Austin, TX (US); Alexey Rastvortsev, Kiryat Bialik (IL)

(73) Assignee: Dell Products L.P., Round Rock, TX (US)

( * ) Notice: Subject to any disclaimer, the term of this patent is extended or adjusted under 35 U.S.C. 154(b) by 52 days.

(21) Appl. No.: 18/090,792

(22) Filed: Dec. 29, 2022

(65) Prior Publication Data
US 2024/0220101 A1    Jul. 4, 2024

(51) Int. Cl.
*G06F 3/06*    (2006.01)

(52) U.S. Cl.
CPC .......... *G06F 3/0604* (2013.01); *G06F 3/0631* (2013.01); *G06F 3/067* (2013.01)

(58) Field of Classification Search
CPC ....... G06F 3/0604; G06F 3/0631; G06F 3/067
See application file for complete search history.

(56) References Cited

U.S. PATENT DOCUMENTS

| | | |
|---|---|---|
| 5,381,539 A | 1/1995 | Yanai et al. |
| 5,551,003 A | 8/1996 | Mattson et al. |
| 5,764,880 A | 6/1998 | Gerdt et al. |
| 6,052,799 A | 4/2000 | Li et al. |
| 6,941,420 B2 | 9/2005 | Butterworth et al. |

(Continued)

FOREIGN PATENT DOCUMENTS

| | | |
|---|---|---|
| WO | 2015108670 A1 | 7/2015 |
| WO | 2020204880 A1 | 10/2020 |
| WO | 2020204882 A1 | 10/2020 |

OTHER PUBLICATIONS

International Search Report and Written Opinion of PCT/US2019/024885 dated Jan. 7, 2020, 13 pages.

(Continued)

*Primary Examiner* — Ryan Bertram
(74) *Attorney, Agent, or Firm* — Ryan, Mason & Lewis, LLP

(57) ABSTRACT

Techniques are provided for implementing a distributed hierarchical cluster management system. A system comprises a data storage system and a cluster management system. The data storage system comprises a cluster of storage nodes that is partitioned into a plurality of subclusters of storage nodes. The cluster management system is deployed on at least some of the storage nodes of the data storage system, and comprises a global management system and a plurality of local management subsystems. Each local management subsystem is configured to manage a respective subcluster of the plurality of subclusters of storage nodes, and communicate with the global management system to provide subcluster status information to the global management system regarding a current state and configuration of the respective subcluster of storage nodes. The global management system is configured to manage the cluster of storage nodes using the subcluster status information provided by the local management subsystems.

20 Claims, 6 Drawing Sheets

(56) References Cited

U.S. PATENT DOCUMENTS

| | | | |
|---|---|---|---|
| 8,843,676 | B2 | 9/2014 | Rajamanickam et al. |
| 9,372,751 | B2 | 6/2016 | McNutt |
| 9,514,014 | B2 | 12/2016 | Webman et al. |
| 9,892,045 | B1 | 2/2018 | Douglis et al. |
| 10,078,598 | B1 | 9/2018 | Wallace et al. |
| 10,331,561 | B1 | 6/2019 | Shilane et al. |
| 10,445,180 | B2 | 10/2019 | Butterworth et al. |
| 10,986,174 | B1 | 4/2021 | Sharma et al. |
| 11,119,668 | B1 | 9/2021 | Keller et al. |
| 11,144,399 | B1 | 10/2021 | Yarimi et al. |
| 11,163,479 | B2 | 11/2021 | Lieblich et al. |
| 11,163,699 | B2 | 11/2021 | Keller et al. |
| 11,221,975 | B2 | 1/2022 | Puder et al. |
| 11,262,933 | B2 | 3/2022 | Matosevich et al. |
| 11,301,162 | B2 | 4/2022 | Matosevich et al. |
| 11,307,935 | B2 | 4/2022 | Keller et al. |
| 11,372,810 | B2 | 6/2022 | Keller et al. |
| 11,416,396 | B2 | 8/2022 | Shatsky et al. |
| 11,418,589 | B1 | 8/2022 | Spiegelman |
| 11,487,432 | B2 | 11/2022 | Aharoni et al. |
| 11,487,460 | B2 | 11/2022 | Keller et al. |
| 11,513,997 | B2 | 11/2022 | Keller et al. |
| 11,550,479 | B1 | 1/2023 | Shatsky et al. |
| 2001/0034752 | A1* | 10/2001 | Kremien ............. H04L 67/1008 707/999.006 |
| 2002/0032835 | A1 | 3/2002 | Li et al. |
| 2003/0009511 | A1* | 1/2003 | Giotta ....................... G06F 9/54 709/201 |
| 2004/0205148 | A1* | 10/2004 | Bae ..................... G06F 11/1425 709/213 |
| 2008/0021853 | A1 | 1/2008 | Modha et al. |
| 2009/0204761 | A1 | 8/2009 | Caprioli et al. |
| 2009/0276593 | A1 | 11/2009 | Jacobson et al. |
| 2013/0305002 | A1 | 11/2013 | Hallak et al. |
| 2014/0215147 | A1 | 7/2014 | Pan |
| 2014/0215262 | A1 | 7/2014 | Li et al. |
| 2014/0244935 | A1 | 8/2014 | Ezra et al. |
| 2016/0103764 | A1 | 4/2016 | Banerjee et al. |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0163587 | A1 | 5/2019 | Anna et al. |
| 2019/0227845 | A1 | 7/2019 | Sridhar et al. |
| 2019/0394266 | A1* | 12/2019 | Fukuyama .......... H04L 67/1044 |
| 2020/0019478 | A1* | 1/2020 | Miyata .................. G06F 3/0685 |
| 2020/0133503 | A1 | 4/2020 | Sun et al. |
| 2020/0341639 | A1* | 10/2020 | Cason ................... G06F 3/0631 |
| 2021/0279187 | A1 | 9/2021 | Puder et al. |
| 2021/0294505 | A1 | 9/2021 | Keller et al. |
| 2021/0294774 | A1 | 9/2021 | Keller et al. |
| 2021/0294775 | A1 | 9/2021 | Keller et al. |
| 2021/0303160 | A1* | 9/2021 | Lieblich .................. G06F 3/067 |
| 2021/0303169 | A1 | 9/2021 | Tagar et al. |
| 2021/0303202 | A1 | 9/2021 | Ben Zeev et al. |
| 2021/0303401 | A1 | 9/2021 | Yarimi et al. |
| 2021/0303407 | A1 | 9/2021 | Keller et al. |
| 2021/0303480 | A1 | 9/2021 | Keller et al. |
| 2021/0373796 | A1 | 12/2021 | Matosevich et al. |
| 2022/0004320 | A1 | 1/2022 | Matosevich et al. |
| 2022/0035788 | A1 | 2/2022 | Aharoni et al. |
| 2022/0113867 | A1 | 4/2022 | Aharoni et al. |
| 2022/0114184 | A1 | 4/2022 | Sharma et al. |
| 2022/0116454 | A1 | 4/2022 | Aharoni et al. |
| 2022/0121458 | A1 | 4/2022 | Moran et al. |
| 2022/0129380 | A1 | 4/2022 | Shatsky et al. |
| 2022/0171567 | A1 | 6/2022 | Matosevich et al. |
| 2022/0187991 | A1 | 6/2022 | Keller et al. |
| 2022/0222113 | A1 | 7/2022 | Shatsky et al. |
| 2022/0342758 | A1 | 10/2022 | Tal et al. |
| 2022/0350497 | A1 | 11/2022 | Matosevich et al. |
| 2022/0358018 | A1 | 11/2022 | Bar Shalom et al. |
| 2022/0405254 | A1 | 12/2022 | Shatsky et al. |
| 2022/0414102 | A1 | 12/2022 | Shatsky et al. |

OTHER PUBLICATIONS

International Search Report and Written Opinion of PCT/US2019/024900 dated Jan. 7, 2020, 12 pages.

Dell EMC, "EMC ScaleIO Basic Architecture Documentation," Technical White Paper, Mar. 2017, 22 pages.

EMC2, "EMC ScaleIO Design Considerations and Best Practices," Technical White Paper, Jun. 2016, 30 pages.

I. Koltsidas et al., "SoftwAre Log-Structured Array (SALSA)—A Unified Stack for SSDs and SMR Disks," IBM Research Report, Dec. 2, 2015, 13 pages.

S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.

Dell EMC, "Dell EMC VxFlex Family Overview," Technical White Paper, May 2019, 44 pages.

J. Nakano et al., "ReViveI/O: Efficient Handling of I/O in Highly-Available Rollback-Recovery Servers," IEEE Symposium on High-Performance Computer Architecture, Feb. 11-15, 2006, pp. 200-211.

Wikipedia, "Raft (Computer Science)," https://en.wikipedia.org/wiki/Raft_(computer_science), Feb. 10, 2020, 4 pages.

Wikipedia, "Paxos (Computer Science)," https://en.wikipedia.org/wiki/Paxos_(computer_science), Dec. 6, 2019, 21 pages.

Wikipedia, "State Machine Replication," https://en.wikipedia.org/wiki/State_machine_replication, Dec. 14, 2019, 9 pages.

Dell Technologies, "Dell EMC PowerFlex: Secure Snapshots," Technical White Paper, Jul. 2020, 17 pages.

Dell Technologies, "Dell EMC PowerFlex: Protected Maintenance Mode," Technical White Paper, Jul. 2020, 20 pages.

Dell Technologies, "Dell EMC PowerFlex: Introduction to Replication," Technical White Paper, Jun. 2020, 34 pages.

Dell Technologies, "Dell EMC PowerFlex: Networking Best Practices and Design Considerations," Best Practices, Jun. 2020, 64 pages.

Dell EMC, "Getting To Know Dell EMC PowerFlex, " Version 3.5.x, Rev. 02, Jan. 2021, 66 pages.

Dell EMC, "Dell EMC VxRack FLEX," Dell EMC Product Overview, Apr. 2018, 5 pages.

G. Soundararajan et al., "Dynamic Resource Allocation for Database Servers Running on Virtual Storage," FAST 2009: Proceedings of the 7th conference on File and storage technologies, Feb. 2009, pp. 71-84.

U.S. Appl. No. 17/511,695, filed in the name of Yosef Shatsky et al. Oct. 27, 2021, and entitled "Write Cache Management."

U.S. Appl. No. 17/512,890, filed in the name of Yosef Shatsky et al. Oct. 28, 2021, and entitled "Utilizing Checkpoints for Resiliency of Metadata in Storage Systems."

U.S. Appl. No. 17/569,198, filed in the name of Yosef Shatsky Jan. 5, 2022, and entitled "Utilizing a Persistent Write Cache as a Redo Log."

U.S. Appl. No. 17/583,365, filed in the name of Doron Tal et al. Jan. 25, 2022, and entitled "Data Deduplication in a Storage System."

U.S. Appl. No. 17/583,787, filed in the name of Michal Yarimi et al. Jan. 25, 2022, and entitled "Intelligent Defragmentation in a Storage System."

U.S. Appl. No. 17/681,449, filed in the name of Yosef Shatsky et al. Feb. 25, 2022, and entitled "Optimization for Garbage Collection in a Storage System."

U.S. Appl. No. 17/714,362, filed in the name of Doron Tal et al. Apr. 6, 2022, and entitled "Optimization for Direct Write to Raid Stripes."

U.S. Appl. No. 17/726,853, filed in the name of Irit Brener-Shalem et al. Apr. 22, 2022, and entitled "Intelligent Load Scheduling in a Storage System."

U.S. Appl. No. 17/729,219, filed in the name of Yosef Shatsky et al. Apr. 26, 2022, and entitled "Load Distribution in a Data Storage System."

U.S. Appl. No. 17/853,364, filed in the name of Yosef Shatsky et al. Jun. 29, 2022, and entitled "Managing Lookup Operations of a Metadata Structure for a Storage System."

(56) References Cited

OTHER PUBLICATIONS

U.S. Appl. No. 17/864,579, filed in the name of Yosef Shatsky et al. Jul. 14, 2022, and entitled "Managing Granularity of a Metadata Structure for a Storage System."
U.S. Appl. No. 17/868,045, filed in the name of Yosef Shatsky et al. Jul. 19, 2022, and entitled "Managing Insert Operations of a Metadata Structure for a Storage System."

* cited by examiner

300

400

CLUSTER MANAGEMENT IN LARGE-SCALE STORAGE SYSTEMS

TECHNICAL FIELD

This disclosure relates generally to data storage systems and, more particularly, to techniques for cluster management in a data storage system.

BACKGROUND

Information technology is widely used by all types of business enterprises for various purposes. As such, the amount of data from various sources, which must be stored and managed in, e.g., datacenters and cloud-based storage systems, continues to increase. To meet such data storage demands, datacenters and cloud-based storage systems are typically implemented using dynamic scale-out storage systems which allow additional data storage nodes to be added to a storage cluster to facilitate more storage capacity as needed. A dynamic scale-out storage system can be implemented using a software-defined storage platform which is configured to provide significant flexibility, enhanced storage performance and scalability for the data storage environment. As a software-defined storage system scales with the addition of storage nodes, however, the ability to provide efficient cluster management and communication can become increasingly problematic and lead to reduced performance for a significantly large-scale cluster of storage nodes.

SUMMARY

Exemplary embodiments of the disclosure include techniques for implementing a distributed hierarchical cluster management system in a data storage system. For example, an exemplary embodiment includes a system which comprises a data storage system, and a cluster management system. The data storage system comprises a cluster of storage nodes that is partitioned into a plurality of subclusters of storage nodes. The cluster management system is deployed on at least some of the storage nodes of the data storage system. The cluster management system comprises a global management system and a plurality of local management subsystems. Each local management subsystem is configured to manage a respective subcluster of the plurality of subclusters of storage nodes, and communicate with the global management system to provide subcluster status information to the global management system regarding a current state and configuration of the respective subcluster of storage nodes. The global management system is configured to manage the cluster of storage nodes using the subcluster status information provided by the local management subsystems.

Other embodiments will be described in the following detailed description of exemplary embodiments, which is to be read in conjunction with the accompanying figures.

DETAILED DESCRIPTION

Exemplary embodiments of the disclosure will now be described in further detail with regard to techniques for cluster management in a data storage system and, in particular, systems and methods for implementing a distributed hierarchical cluster management system for a scale-out software-defined storage platform. For purposes of illustration, exemplary embodiments will be described herein with reference to exemplary network computing systems, such as distributed storage systems, which implement data processing systems and associated computers, servers, storage devices and other processing devices. It is to be appreciated, however, that these and other embodiments are not restricted to the particular illustrative system and device configurations shown. Accordingly, the term "network computing system" as used herein is intended to be broadly construed, so as to encompass, for example, processing systems comprising cloud computing and storage systems, as well as other types of processing systems comprising various combinations of physical and virtual processing resources. A network computing system may therefore comprise, for example, at least one data center or other cloud-based systems that include one or more cloud systems that host multiple tenants which share cloud resources. Numerous different types of enterprise computing and storage systems are also encompassed by the term "network computing system" as that term is broadly used herein.

Figure 1:
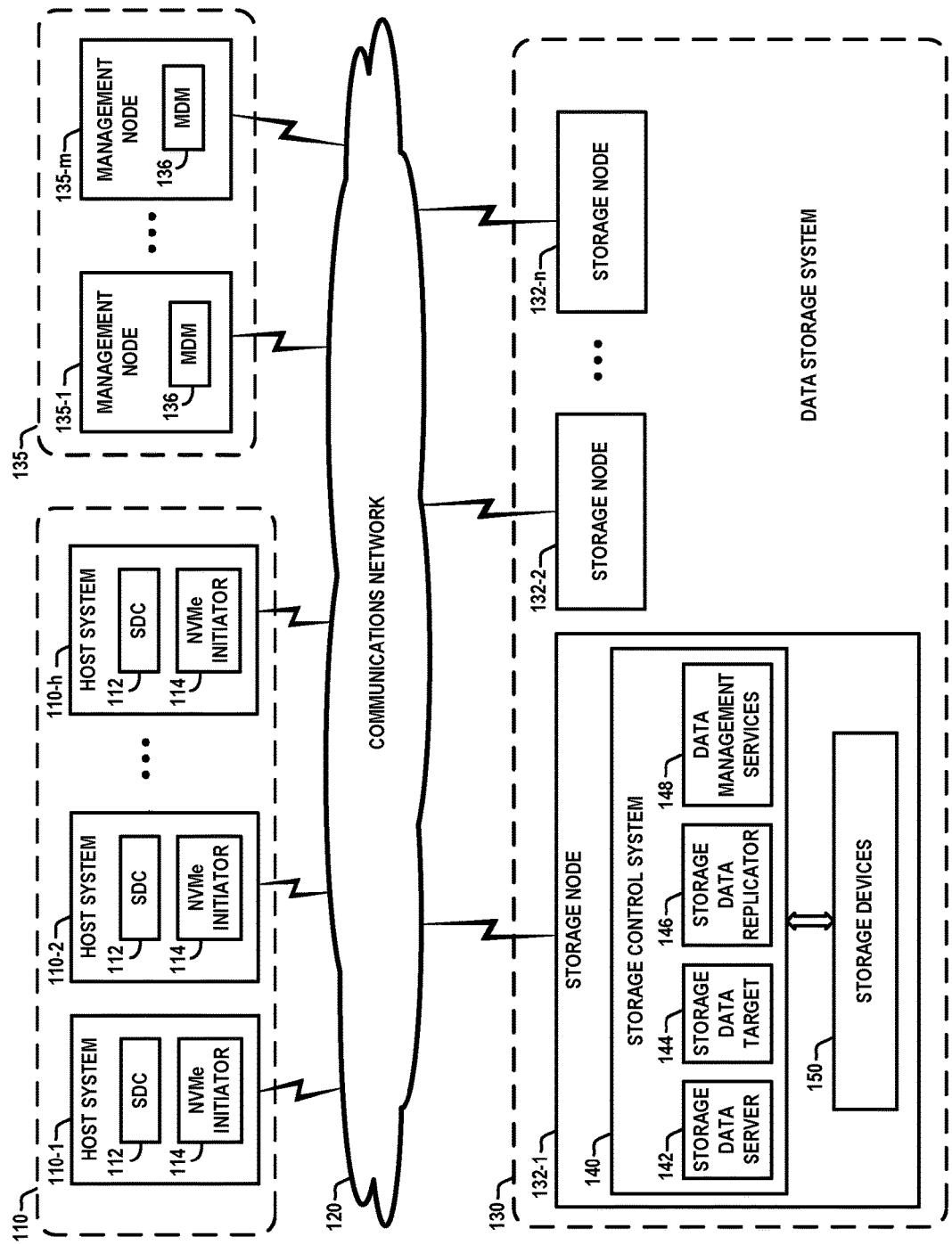
FIG. 1 schematically illustrates a network computing environment comprising a data storage system which can be configured to implement a distributed hierarchical cluster management system, according to an exemplary embodiment of the disclosure.

FIG. 1 schematically illustrates a network computing environment comprising a data storage system which can be configured to implement a distributed cluster management system, according to an exemplary embodiment of the disclosure. In particular, FIG. 1 schematically illustrates a network computing environment 100 which comprises one or more host systems 110-1, 110-2, . . . 110-h (collectively, host systems 110), a communications network 120, a data storage system 130 comprising a cluster of storage nodes 132-1, 132-2, . . . , 132-n (collectively, storage nodes 132), and a cluster of management nodes 135 comprising a plurality of management nodes 135-1, . . . , 135-m (alternatively, management nodes 135). In some embodiments, each host system 110-1, 110-2, . . . 110-h comprises a storage data client (SDC) 112 and a non-volatile memory express (NVMe) initiator 114 (or NVMe initiator 114), the functions of which will be explained below. In addition, each management node 135-1, . . . , 135-m comprises a respective metadata manager (MDM) 136. As further shown in FIG. 1, the storage node 132-1 comprises a storage control system 140, and storage devices 150. In some embodiments, the storage control system 140 is a software-defined storage control system which comprises a storage data server (SDS) 142, a storage data target (SDT) 144, and a storage data replicator (SDR) 146, and data management services 148, the functions of which will be explained below. In some embodiments, the other storage nodes 132-2 . . . 132-*n* have the same or similar configuration as the storage node 132-1 shown in FIG. 1.

The host systems 110 comprise physical server nodes and/or virtual server nodes (e.g., compute nodes) which host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). In some embodiments, the host systems 110 comprise application servers, database servers, etc. The host systems 110 can include virtual nodes such as virtual machines and container systems. In some embodiments, the host systems 110 comprise a cluster of computing nodes of an enterprise computing system, a cloud-based computing system, or other types of computing systems or information processing systems comprising multiple computing nodes associated with respective users. The host systems 110 issue data access requests to the data storage system 130, wherein the data access requests include (i) write requests to store data in one or more of the storage nodes 132 and (ii) read requests to access data that is stored in one or more of the storage nodes 132.

The communications network 120 is configured to enable communication between the host systems 110 and the storage nodes 132, and between the management nodes 135, the host systems 110, and the storage nodes 132, as well as to enable peer-to-peer communication between the storage nodes 132. In this regard, while the communications network 120 is generically depicted in FIG. 1, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., IP-based or Fiber Channel storage fabric), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control Protocol/Internet Protocol (TCP/IP) or other communication protocols such as Fibre Channel (FC), FC over Ethernet (FCOE), RDMA over Converged Ethernet (RoCE), Internet Small Computer System Interface (iSCSI), Peripheral Component Interconnect express (PCIe), Infini-Band, Gigabit Ethernet, etc., to implement I/O channels and support storage network connectivity. Numerous alternative networking arrangements are possible in a given embodiment, as will be appreciated by those skilled in the art.

In some embodiments, each storage node 132 comprises a server node (e.g., storage-only node) that is implemented on, e.g., a physical server machine or storage appliance comprising hardware processors, system memory, and other hardware resources that execute software and firmware to implement the functionality of the storage node 132 and the associated storage control system 140. In some embodiments, each storage node 132 comprises a plurality of control processors which execute a lightweight operating system (e.g., a customized lightweight Linux kernel) and functional software (e.g., software-defined storage software) to implement functions of the storage control system 140, as discussed in further detail below.

The storage devices 150 of a given storage node 132 can be internal storage devices and/or direct-attached storage devices, and may comprise one or more of various types of storage devices such as hard-disk drives (HDDs), solid-state drives (SSDs), flash memory cards (e.g., PCIe cards), or other types of non-volatile memory (NVM) devices including, but not limited to, non-volatile random-access memory (NVRAM), phase-change RAM (PC-RAM), magnetic RAM (MRAM), and other types of storage media, etc. In some embodiments, the storage devices 150 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices 150 may be implemented on each storage node 132. In this regard, the term "storage device" as used herein should be broadly construed to encompass all types of persistent storage media including hybrid drives. On a given storage node 132, the storage control system 140 is configured to communicate with the storage devices 150 through any suitable host interface, e.g., a host bus adapter, using suitable protocols such as Advanced Technology Attachment (ATA), serial ATA (SATA), external SATA (eSATA), parallel ATA (PATA), non-volatile memory express (NVMe), small computer system interface (SCSI), serial attached SCSI (SAS), peripheral component interconnect express (PCIe), etc.

The data storage system 130 may comprise any type of data storage system, or a combination of data storage systems, including, but not limited to, a storage area network (SAN) system, a dynamic scale-out data storage system, or other types of distributed data storage systems comprising software-defined storage, clustered or distributed virtual and/or physical infrastructure. The term "data storage system" as used herein should be broadly construed and not viewed as being limited to storage systems of any particular type or types. In some embodiments, the data storage system 130 comprises a dynamic scale-out storage system which allows additional storage nodes to be added (or removed) to the cluster to scale the performance and storage capacity of the data storage system 130. It is to be noted that each storage node 132 and associated storage devices 150 is an example of what is more generally referred to herein as a "storage system" or a "storage array."

In some embodiments, the data storage system 130 comprises a dynamic scale-out software-defined storage system which is configured to implement a high-capacity block-level SAN storage system (e.g., virtual SAN system) that consolidates the capacity of the local storage devices 150 (e.g., HDDs, SSDs, NVMe flash storage, flash PCIe cards etc.) of the storage nodes 132 into shared block storage which is logically partitioned into logical storage volumes identified by, e.g., logical unit numbers (LUNs). In an exemplary embodiment of a scale-out software-defined SAN storage system, the storage control systems 140 comprise software components of a software-defined storage system, which are executed on the storage nodes 132 to implement a software-defined storage environment in which the storage nodes 132 form a loosely coupled storage server cluster and collectively communicate and operate to create a server-based SAN (e.g., virtual SAN) to provide host access to a virtual pool of block storage using the combined storage capacity (e.g., storage devices 150) of the storage nodes 132.

In some embodiments, the SDC 112 components, the MDM 136 components, the SDS 142 components, the SDT 144 components, and the SDR 146 components of the storage control systems 140 comprise software components of a software-defined storage platform, wherein the software components are installed on physical server machines (or server nodes) such as application servers, storage servers, control servers, etc. In some embodiments, virtual machines (e.g., Linux-based virtual machines) are utilized to host the software components of the software-defined storage platform. The software components collectively implement various functions for deploying and managing a software-defined, scale-out server SAN architecture that can grow from a few servers to thousands of severs.

For example, the SDS 142 comprises a service that is configured to manage the storage capacity (e.g., storage devices 150) of a single server (e.g., storage node 132) and provide back-end access to the storage devices of the server. In other words, the SDS 142 service is installed on each server that contributes some or all of the capacity of its local storage devices to the scale-out data storage system. More specifically, in the scale-out software-define storage environment, the SDSs 142 of the storage control systems 140 are configured to create and manage storage pools (e.g., virtual pools of block storage) by aggregating storage capacity of the respective storage devices 150 and dividing each storage pool into one or more volumes, wherein the volumes are exposed to the SDCs 112 of the host systems 110 as virtual block devices. For example, a virtual block device can correspond to a volume of a storage pool. Each virtual block device comprises any number of actual physical storage devices, wherein each virtual block device is preferably homogenous in terms of the type of storage devices that make up the block device (e.g., a block device can include only HDD devices or SSD devices, etc.). In this regard, each instance of the SDS 142 that runs on a respective one of the storage nodes 132 contributes some or all of its local storage space to an aggregated virtual pool of block storage with varying performance tiers (e.g., HDD, SSD, etc.) within a virtual SAN.

In some embodiments, each SDC 112 that executes on a given host system 110 comprises a lightweight block device driver that is deployed to expose shared block volumes to the host systems 110. In particular, each SDC 112 is configured to expose the storage volumes as block devices to the applications located on the same server (e.g., application server) on which the SDC 112 is installed. In other words, as shown in FIG. 1, the SDCs 112 run on the same server machines as the host systems 110 which require access to the block devices exposed and managed by the SDSs 142 of the storage nodes 132. The SDC 112 of a given host system 110 exposes block devices representing the virtual storage volumes that are currently mapped to the given host system 110. In particular, the SDC 112 for a given host system 110 serves as a block driver for the host system 110, wherein the SDC 112 intercepts I/O requests, and utilizes the intercepted I/O request to access the block storage that is managed by the SDSs 142. The SDCs 112 are installed in the operating system or hypervisor hosting the application layer, and provides the operating system or hypervisor (which runs the SDC 112) access to the logical block devices (e.g., volumes). The SDCs 112 have knowledge of which SDSs 142 hold its block data, so multipathing can be accomplished natively through the SDCs 112, where the communications network 120 is configured to provide an any-to-any connection between the host systems 110 and the storage nodes 132. More specifically, each SDC 112 connects to every SDS 142, which eliminates the need for multipath software.

In some embodiments, the management nodes 135-1, . . . , 135-m comprise servers (e.g., control servers) that host and run respective instances of the MDM 136 component to implement a management layer which manages and configures the software-defined storage system in the network computing environment 100. The MDM 136 is a service that functions as a monitoring and configuration agent of the storage environment. More specifically, in some embodiments, the management nodes 135-1, . . . , 135-m collectively host a tightly-coupled cluster of MDMs 136, which is configured to supervise the operations of the storage cluster and manage storage cluster configurations. For example, the cluster of MDMs 136 (or MDM cluster) manage the storage system by aggregating the entire storage exposed to the MDM cluster by the SDSs 142 to generate a virtual storage layer (e.g., virtual SAN storage layer), wherein logical volumes can be defined over storage pools and exposed to host applications as a local storage device using the SDCs 112.

Further, the cluster of MDMs 136 is configured to manage various types of metadata associated with the software-defined storage system. For example, such metadata includes a mapping of the SDCs 112 to the SDSs 142 of the storage nodes 132, wherein such mapping information is provided to the SDCs 112 and the SDSs 142 to allow such components to control input/output (I/O) data path operations (e.g., allow the SDCs 112 to communicate with target SDSs 142 to access data in logical volumes that are mapped to the SDCs 112), while the cluster of MDMs 136 operate outside of the data path such that no I/O operations run through the MDMs 136. In addition, the cluster of MDMs 136 collects connectivity status updates from the SDCs 112 to monitor all connections between SDCs 112 and the SDSs 142 to determine the current system state, and posts events whenever a given SDC 112 connects to or disconnects from a specific IP address of a given SDS 142.

In addition, the cluster of MDMs 136 is configured to manage various management operations such as data migration, rebuilds, and other system-related functions. In this regard, the cluster of MDMs 136 generate and manage various types of metadata that are required to perform various management operations in the storage environment such as, e.g., performing data migration operations, performing rebalancing operations, managing configuration changes, managing the SDCs 112 and the SDSs 142, maintaining and updating device mappings, maintaining management metadata for controlling data protection operations such as snapshots, replication, RAID configurations, etc., managing system capacity including storage device allocations and/or release of capacity, performing operations for recovery from errors and failures, and system rebuild tasks, etc. The cluster of MDMs 136 communicate with the SDCs 112 to provide notification of changes in data layout, and communicate with the SDSs 142 to coordinate rebalancing operations. In some embodiments, the cluster of MDMs 136 are configured to implement a distributed hierarchical cluster management system comprising a global management system (e.g., global MDM cluster) and a plurality of local management subsystems (e.g., local MDM subclusters)

using high-availability MDM cluster modes, the details of which will be explained in further detail below in conjunction with FIGS. 2, 3, and 4.

In some embodiments, the software-defined storage system utilizes various logical entities which link the physical layer to the virtual storage layer, wherein such logical entities include protection domains, fault sets, and storage pools. In some embodiments, a protection domain is a logical entity which comprises a group of SDSs 142 which provide backup for each other. Each SDS 142 belongs to only one protection domain such that each protection domain comprises a unique set of SDSs 142. In some embodiments, each protection domain can have up to a maximum number of SDS nodes (e.g., 128 SDS nodes). The use of protection domains enables optimal performance, reduction of mean time between failure (MTF) issues, and the ability to sustain multiple failures in different protection domains.

Further, in some embodiments, a fault set is a logical entity which defines a logical group of SDS nodes (within a protection domain) that are more inclined to fail together, e.g., a group of SDS nodes within a given protection domain that are all powered in a same rack. By grouping SDS nodes into a given fault set, the system is configured to mirror the data for all storage devices in the given fault set, wherein mirroring is performed on SDS nodes that are outside the given fault set. A fault unit can be either a fault set or an SDS node that is not associated with a fault set. In some embodiments, user data is maintained in a RAID-1 mesh mirrored layout, where each piece of data is stored on two different fault units. The copies are distributed over the storage devices according to an algorithm that ensures uniform load of each fault unit in terms of capacity and expected network load.

Moreover, in some embodiments, a storage pool is a logical entity which defines a set of physical storage devices in a protection domain, wherein each storage device belongs to only one storage pool. When a volume is configured over the virtualization storage layer, the volume is distributed over all devices residing in the same storage pool. Each storage pool comprises a homogeneous set of storage devices (e.g., HDD storage pool, or SSD storage pool) to enable storage tiering. In some embodiments, each volume block has two copies located on two different fault units (e.g., two different SDS nodes), which allows the system to maintain data availability following a single-point failure.

The SDR 146 is a software component that is configured to implement a data replication system, e.g., journal-based asynchronous replication. In some embodiments, asynchronous replication is performed between two peer data storage systems, which are connected via a WAN. In general, asynchronous replication involves writing data to a source (primary) volume in a first data storage system, acknowledging completion of an I/O write operation to a host application before the data is replicated to a target (replica) volume in a second (remote) data storage system. With asynchronous replication, the I/O write operations at a source storage node are logged in a replication journal by a source SDR 146 on the source storage node, and the replication journal is periodically transmitted at scheduled times to a target storage node, wherein a target SDR 146 on the target storage node processes the received replication journal to replicate data to a target (replica) volume. The data replication system can be utilized for various purposes including, but not limited to, recovering from a physical or logical disaster, migrating data, testing data at a remote site, or offloading a data backup operation.

More specifically, in the exemplary embodiment of FIG. 1, the SDR 146 is responsible for processing all I/O requests associated with replicated volumes. In the source system, for replicated volumes, the SDCs 112 communicate with the SDR 146. For non-replicated volumes, the SDCs 112 communicate directly with the SDSs 142. At a source storage node, application I/O requests associated with a replicated volume are sent by an SDC 112 to a source SDR 146. The source SDR 146 will write the required journal data to a replication journal volume, and then send a duplicate of the replication I/O write request and associated user data to the SDS 142 wherein the SDS 142 performs write operations to write the received I/O user data in a primary volume. The journal data is then transmitted to a target SDR 146 on a target storage node, which processes the received replication journal to replicate data to the target (replica) volume. In some embodiments, a minimum of two SDRs are deployed on the source and target storage nodes to maintain high availability. If one SDR fails, the management layer (e.g., MDM nodes) directs the SDCs to send the I/O requests for replicated volumes to an available SDR 146.

The SDT 144 is a software component that is configured to provide support for NVMe-oF, in particular, NVMe over TCP (NVMe/TCP) which enables NVMe-OF across a standard Ethernet network. In some embodiments, the SDT 144 is configured in the storage layer to handle the I/O requests of the NVMe initiators 114 to provide support for the NVMe/TCP storage protocol for front end connectivity, and thus, allow the use of NVMe/TCP hosts in addition to the SDCs 112. In some embodiments, the SDT 144 is an NVMe target that is configured to translate control and I/O data path packets to the NVMe standard protocol, wherein each NVMe initiator 114 is serviced by multiple SDTs 144 depending on the supported number of paths in the NVMe multipathing driver. In essence, I/O requests are sent from a host NVMe initiator 114 (which installed in the host operating system or hypervisor) to the SDT 144, and the SDT 144 communicates with a target SDS 142 to direct the I/O request to the target SDS 142.

The data management services 148 include one or more types of data management services including, but not limited to, inline data compression/decompression, deduplication, thin provisioning, and data protection functions such as data replication, backup, snapshots, and data protection and resiliency schemes based on data striping and/or parity (e.g., erasure coding, RAID, etc.), and other types of data management functions, depending on the system configuration.

FIG. 1 shows an exemplary embodiment of a two-layer deployment in which the SDCs 112 (which consume storage) are deployed separately from the SDSs 142 (which contribute storage), e.g., the SDCs 112 are deployed on compute-only server nodes which host end-user applications, while the SDSs 142 are deployed on storage-only server nodes which contribute storage to the virtual SAN storage system. Moreover, while FIG. 1 shows an exemplary embodiment in which the metadata managers 136 (which manage storage blocks and track data locations across the storage system) are separately deployed on management nodes 135, in some embodiments, the metadata managers 136 can be deployed with the SDSs 142 on the storage nodes 132 (e.g., each metadata manager 136 can be deployed on a separate one of the storage-only server nodes).

In other embodiments, a converged infrastructure (e.g., hyperconverged infrastructure) can be implemented to provide a single-layer deployment in which, e.g., the SDCs 112 and the SDSs 142 are deployed on the same servers (each server node deploys a SDC 112 and an SDS 142) such that each server node is a data storage consumer (compute node) and a data storage supplier (storage provider node). In addition, for a single-layer deployment, the metadata managers 136 can be deployed on different server nodes which also host the SDCs 112 and SDSs 142. In other embodiments, the system of FIG. 1 can be a hybrid system that is implemented with a combination of a single-layer and two-layer deployment.

Figure 2:
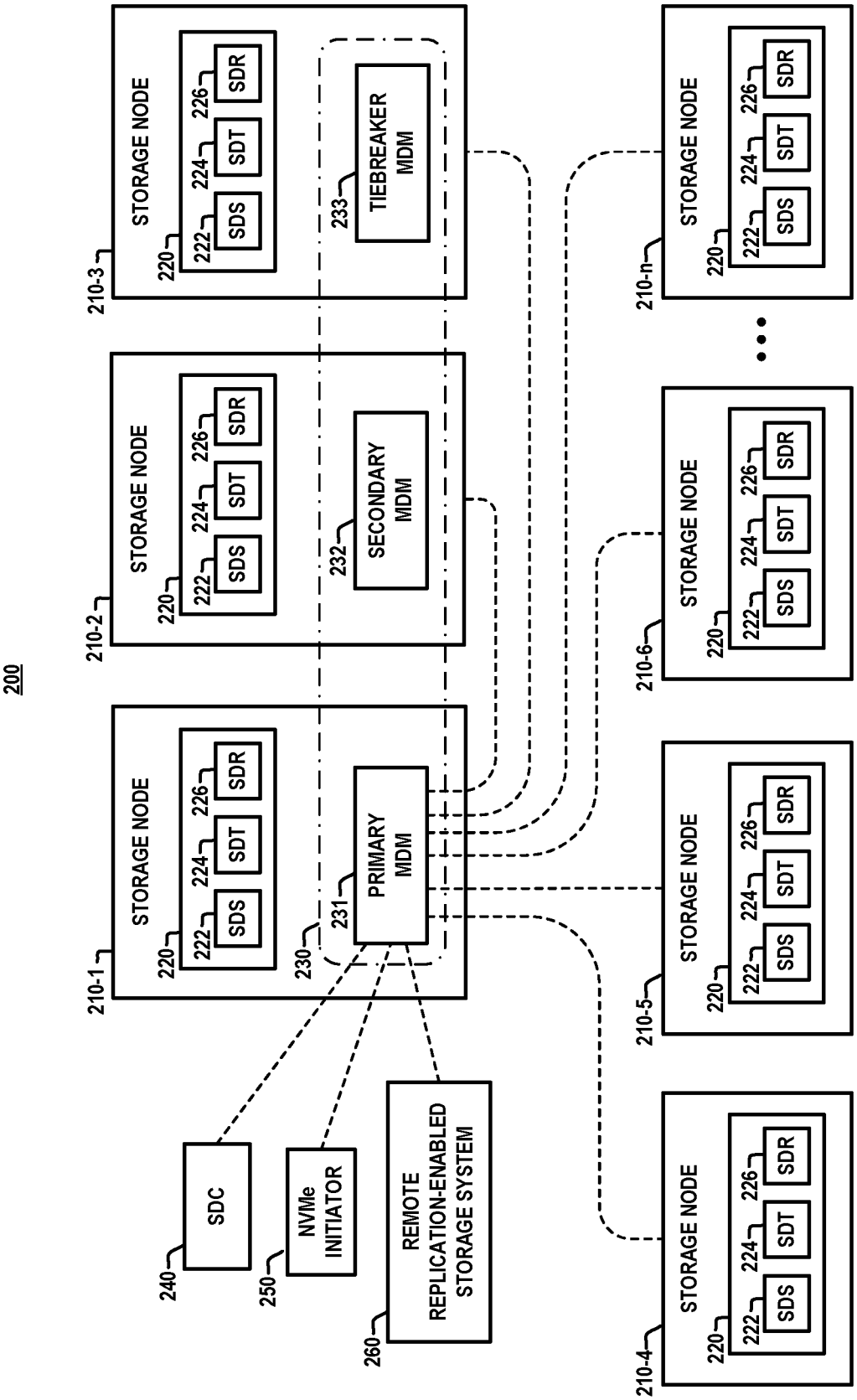
FIG. 2 schematically illustrates a data storage system which implements a cluster management system, according to an exemplary embodiment of the disclosure.

FIG. 2 schematically illustrates a data storage system which implements a cluster management system, according to an exemplary embodiment of the disclosure. In particular, FIG. 2 schematically illustrates a software-defined storage environment 200 which comprises a cluster of storage nodes 210-1, 210-2, 210-3, 210-4, 210-5, 210-6, . . . , 210-n (collectively, storage nodes 210), wherein each storage node 210 hosts an instance of a storage control system 220 having various software components including, but not limited to, an SDS 222, an SDT 224, and an SDR 226, where such components implement respective functions as discussed above.

Moreover, FIG. 2 illustrates an exemplary embodiment of a multi-MDM environment which comprises an MDM cluster 230 (alternatively, management node cluster 230) comprising multiple instances of MDM nodes which are separately deployed on respective storage nodes 210-1, 210-2, and 210-3 to support high-availability cluster management. The MDM cluster 230 is configured to generate and maintain the metadata that is utilized for configuring, managing, and controlling operations of the software-defined storage environment 200. Once deployed, the MDM nodes of the MDM cluster 230 are assigned specific roles. For example, in an exemplary embodiment, the MDM cluster 230 comprises a primary MDM node 231 (or master MDM), a secondary MDM node 232 (or slave MDM), and a tiebreaker MDM node 233.

In an exemplary embodiment, the MDM cluster 230 is configured to operate as a global MDM cluster which is responsible for communicating with all of the software-defined storage system components (e.g., SDCs, SDTs, SDSs, SDRs, etc.) that reside on server nodes (e.g., compute-only server nodes, storage-only server nodes, hyper-converged server nodes) in the given software-defined storage environment 200. For example, in the exemplary embodiment of FIG. 2, the primary MDM node 231 is the MDM node in the MDM cluster 230 which is assigned and configured to control and communicate with, e.g., the SDS 222, SDT 224, and SDR 226 components of the storage control systems 220 in each of the storage nodes 210, as well as other components such an SDC 240 and NVMe initiator 250 of each compute node in the network environment, and a management MDM node of a remote replication-enabled storage system 260, etc.

The secondary MDM node 232 is an MDM node in the MDM cluster 230 which is assigned and configured to take over the role as a primary MDM node, if needed in the event of a failure of the primary MDM node 231. In some embodiments, the primary MDM node 231 contains and updates an MDM repository (e.g., database which stores the system metadata (e.g., SDS configuration data, etc.), where the MDM repository is continuously replicated to the secondary MDM node 232, so that the secondary MDM node 232 can take over the role as a primary MDM node without delay. In this regard, the primary and secondary MDM nodes 231 and 232 are management nodes which are MDM replicas. On the other hand, the tiebreaker MDM node 233 is an MDM node in the MDM cluster 230 which is assigned a sole role to help determine which MDM node in the MDM cluster 230 is the master MDM node. The tiebreaker MDM node 233 does not assume any management functions.

FIG. 2 illustrates an exemplary configuration of a 3-node MDM cluster 230 with one primary MDM node, one secondary MDM node, and one tiebreaker MDM node. In another exemplary embodiment, the software-defined storage environment 200 can implement, e.g., a 5-node MDM cluster comprising one primary MDM node, two secondary MDM nodes, and two tiebreaker MDM nodes. The 3-node and 5-node MDM clusters ensure that there is always an odd number of MDMs in the management node cluster which, in turn, guarantees that there is always a majority of MDM nodes electing the primary MDM node. Further, with regard to the MDM manager, the 3-node cluster (with only one secondary MDM node) allows for a single point of failure, while the 5-node cluster (with two secondary MDM nodes) allows for two points of failure and, thus, increased resiliency.

FIG. 2 illustrates an exemplary software-defined storage environment in which a single MDM manager (e.g., primary MDM node 231) is configured to manage and communicate with all software components (e.g., SDSs 222, SDTs 224, SDRs 226, SDCs 240, NVMe initiators 250, etc.) deployed on the server nodes (e.g., storage server nodes, compute server nodes) in the storage environment. In addition, the single primary MDM node 231 is responsible for generating and managing a large amount of metadata associated with all logical entities of the virtual storage system, such as protection domains, replication groups, fault sets, storage volumes, etc. For a relatively small-scale storage environment (e.g., on the order of tens of SDS components or less), a single MDM manager node can efficiently manage all the software components (e.g., SDSs, SDCs, etc.) and logical entities (e.g., protection domains), which are used to implement the storage environment.

As the software-defined storage environment scales to an increasingly larger number of storage server nodes (e.g., on the order of hundreds or thousands of SDS components), however, there can be significant challenges in utilizing a single MDM manager node to manage such a large-scale software-defined storage environment. For example, the single MDM manager node must communicate with a large number of system components, e.g., SDSs 222, SDTs 224, SDRs 226, SDCs 240, NVMe initiators 250, etc., to configure the storage environment and manage various operations performed in the storage environment. Such communication requires a significant amount of network and processing load from the single MDM manager node and the server node which hosts the single MDM manager node, which can result in (i) increased processing time due to the many-to-one communication that is required between the large number of SDSs and the primary MDM node, (ii) increased convergence time to respond to changes in the storage environment (e.g., rebalancing data over SDS nodes when additional SDS nodes are added, etc.), (iii) increased use of system resources to generate, update, and manage the metadata associated with the software components and logical entities (e.g., protection domains) that define the virtualization storage layer, etc.

Moreover, a given storage environment can have a large number of SDS nodes partitioned into a large number of protection domains (e.g., 10, 100, etc.), wherein each protection domain is managed almost completely independently of each other, as there are no shared resources between protection domains. For example, when the primary MDM node 231 determines that user data is not balanced across devices in a given storage pool of a given protection domain, the primary MDM node initiates a rebalancing process to restore the balance in which data copies are moved from the most utilized devices to the least utilized devices of the storage pool, which involves moving a given one of the data copies to a different SDS server. In some embodiments, a rebalance operation occurs when the primary MDM node detects that the user data is not evenly balanced across the fault units in a storage pool. This can occur as a result of several conditions such as, e.g., addition/removal of one or more SDS nodes, addition/removal of storage devices on one or more storage nodes, or following a recovery from a failure. In this regard, the use of a single primary MDM node 231 to manage rebalance operations over all protection domains in a large-scale software-defined storage environment provides additional processing and communication load on the single primary MDM node, which can be problematic in a large-scale storage environment with many protection domains. Therefore, for at least the reasons noted above, the use of a single primary MDM node essentially limits the scaling factor of the software-defined storage environment.

To address the issues associated with the use of a single primary MDM node, exemplary embodiments of the disclosure provide techniques for dividing a cluster of storage nodes of a software-defined storage system into a plurality of subclusters where each subcluster of storage nodes system comprises a local management system (e.g., local MDM subcluster) which comprises a local primary MDM node that is configured to locally manage a respective subcluster of storage nodes and report to a global management system (e.g., a global MDM cluster having a global primary MDM node). This management configuration essentially comprises a hierarchical management system which serves to split the responsibilities of the global primary MDM node between the local primary MDM nodes of respective local management subsystems, which significantly reduces the network and processing load of the node hosting the global primary MDM node, and which allows the software-defined storage environment to scale to a significant large number of storage nodes (e.g., 2048 nodes or greater). Each local management subsystem can be implemented using a redundant MDM cluster (e.g., 3-node or 5-node MDM cluster) to provide a high-availability solution for each local management subsystem.

Figure 3:
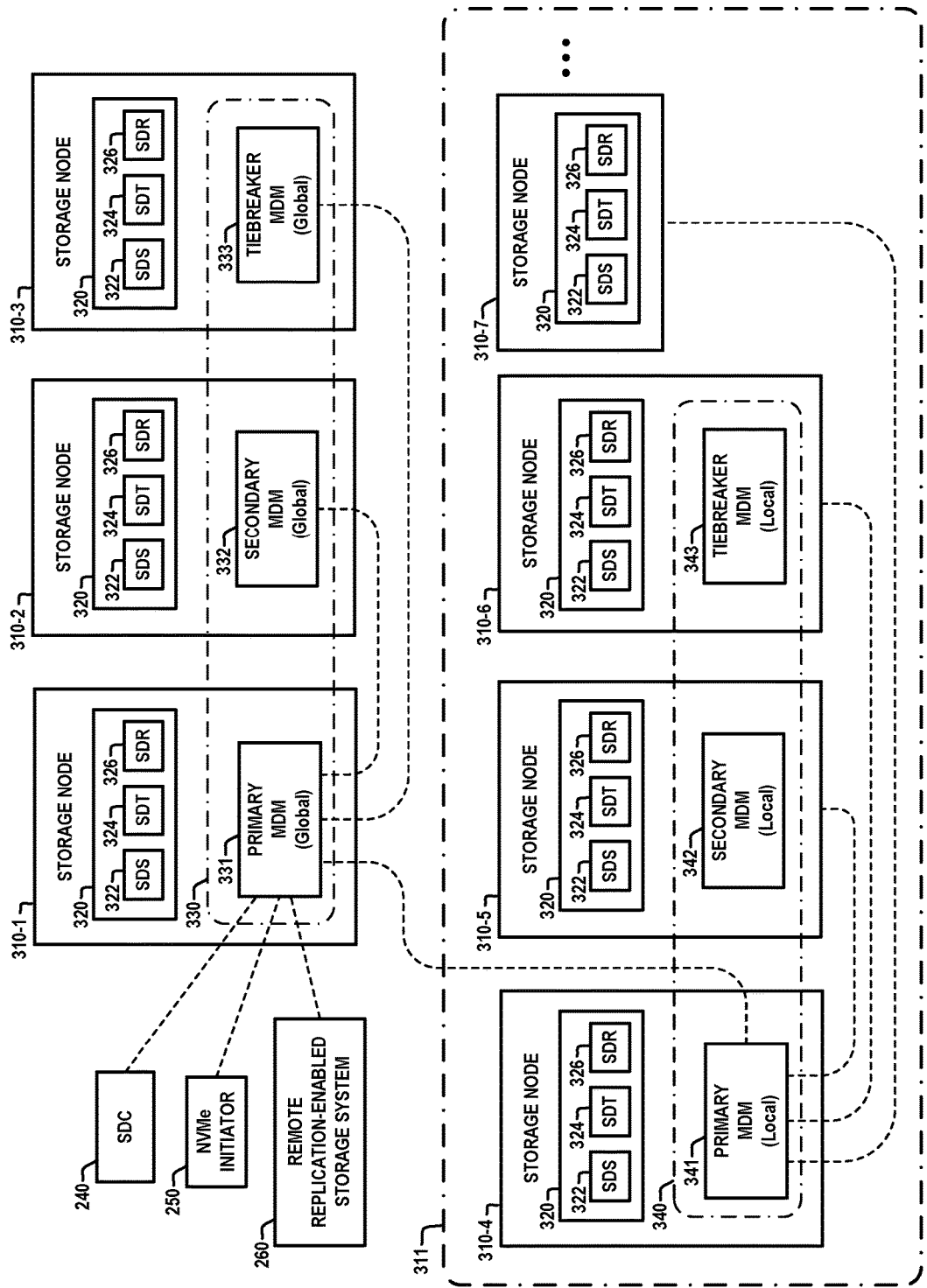
FIG. 3 schematically illustrates a data storage system which implements a distributed hierarchical cluster management system, according to an exemplary embodiment of the disclosure.

For example, FIG. 3 schematically illustrates a data storage system which implements a distributed hierarchical cluster management system, according to an exemplary embodiment of the disclosure. In particular, FIG. 3 schematically illustrates a software-defined storage environment 300 which comprises a cluster of storage nodes 310-1, 310-2, 310-3, 310-4, 310-5, 310-6, 310-7, etc. (collectively, storage nodes 310), wherein each storage node 310 hosts a storage control system 320 having various software components including, but not limited to, an SDS 322, an SDT 324, and an SDR 326, where such components perform respective functions as discussed above.

Moreover, FIG. 3 illustrates an exemplary embodiment in which the cluster of storage nodes 310 of the software-defined storage environment 300 are divided into a plurality of subclusters of storage nodes. For example, FIG. 3 illustrates an exemplary embodiment in which the software-defined storage environment 300 comprises a subcluster 311 comprising at least four storage nodes, e.g., storage nodes 310-4, 310-5, 310-6, 310-7, although it is to be understood that the subcluster 311 can include more than four storage nodes. While only one subcluster 311 is specifically depicted in FIG. 3 for ease of illustration, it is to be understood that the software-defined storage environment 300 would have multiple subclusters of storage nodes. For example, the storage nodes 310-1, 310-2, and 310-3 could be included in respective ones of three different subclusters of storage nodes. Moreover, in some embodiments, at least one of the storage nodes 310-1, 310-2, and 310-3 could be included in the subcluster 311.

In some embodiments, each subcluster of storage nodes in the software-defined storage environment 300 comprises a unique set of storage nodes within a protection domain. In other words, in some embodiments, the storage nodes 310 are partitioned into subclusters by logically dividing the storage nodes 310 into protection domains, wherein each protection domain is deemed a subcluster of storage nodes. In some embodiments, each protection domain includes at least four storage nodes. In other embodiments, the storage nodes 310 of the software-defined storage environment 300 can be divided into subclusters based on other factors, e.g., the storage nodes that are physically located in a same rack or cabinet can be deemed to be a subcluster of storage nodes.

Moreover, FIG. 3 illustrates an exemplary embodiment of a distributed hierarchical cluster management system which comprises a global management system 330 (alternatively, global MDM cluster 330) and a local management subsystem 340 (alternatively, local MDM subcluster 330). The global MDM cluster 330 comprises a global primary MDM node 331, one global secondary MDM node 332, and one global tiebreaker MDM node 333, which are separately deployed on the respective storage nodes 310-1, 310-2, and 310-3 (to provide a high-availability 3-node global management cluster). The local MDM subcluster 340 comprises a local primary MDM node 341, one local secondary MDM node 342, and one local tiebreaker MDM node 343, which are separately deployed on the respective storage nodes 310-4, 310-5, and 310-5 (to provide a high-availability 3-node local management subsystem).

In the exemplary distributed hierarchical cluster management system shown in FIG. 3, the local management subsystem 340 is configured to manage the storage nodes within the subcluster 311, and report to the global management system 330. While only one local management subsystem 340 is specifically depicted in FIG. 3 for ease of illustration, it is to be understood that in some embodiments, the software-defined storage environment 300 would have multiple local management subsystems (one for each subcluster of storage nodes), where each subcluster of storage nodes would be managed by a respective local management subsystem. In this configuration, the management responsibilities are divided among the global primary MDM node 331 and the local primary MDM nodes (e.g., local primary MDM node 341) of the subclusters.

For example, similar to the exemplary embodiment of FIG. 2, the global primary MDM node 331 is responsible for managing and communicating with client drivers (e.g., SDC 240 and NVMe initiator 250 components) of the compute nodes in the network environment, and a management MDM node of a remote replication-enabled storage system 260, etc. With this configuration, client applications (application layer) using the local drivers, e.g., SDCs and NVMe host drivers, will communicate with the global primary MDM node 331 to obtain information needed to access storage volumes that are exposed by the virtual storage layer, without the need to know or understand the internal splits (e.g., subclusters and hierarchical management system) within the software-defined storage environment 300. In other words, the hierarchical system is viewed from outside the storage environment as a single global MDM cluster with no understanding of the internal optimization of subcluster/sub protection domain mechanism.

In addition, the global primary MDM node 331 is responsible for managing all objects in the storage environment and assigning unique identifiers (IDs) to the objects and components of the storage environment. The global primary MDM node 331 is responsible for collecting statistics from all subsystems and exposing such statistics to user interface components. The global primary MDM node 331 is responsive for managing all subsystems and propagating user commands to relevant subsystems. The global primary MDM node 331 is responsible for updating each local primary MDM node of each local management subsystem of the existence and current state of all other local primary MDM nodes and respective local management subsystems. The global primary MDM node 331 is configured to control NVMe-related functionality. The global primary MDM node 331 is configured to control volume migration operations for migrating volumes between subclusters or protection domains (e.g., inter-PD volume migration). The global primary MDM node 331 is configured to manage asynchronous replication resources between different subclusters or protection domains, but not within the given subclusters or protection domains.

As schematically illustrated in FIG. 3, in some embodiments, the global primary MDM node 331 communicates with (i) the global secondary MDM node 332 and the global tiebreaker MDM node 333 in the global MDM cluster 330 to, e.g., replicate a global MDM repository and provide other synchronization information updates to the global MDM nodes, (ii) the client drivers (e.g., the SDC 240 and the NVMe initiator 250 components), and (iii) the local primary MDM nodes (e.g., local primary MDM node 341) of each local management subsystem for each of the subclusters. However, the global primary MDM node 331 does not specifically manage or communicate with the various software components, e.g., SDS 322, SDT 324, SDR 326, etc., of the storage control systems 320. As such, the distributed hierarchical cluster management system provides a significant reduction of the network and processing load of the server node hosting the global primary MDM node 331 in instances where the software-defined storage environment 300 comprises hundreds or thousands of server nodes (e.g., storage nodes, compute nodes and/or hybrid nodes).

In some embodiments, the global primary MDM node 331 maintains a global MDM repository which contains all relevant metadata for the given storage environment, while each local primary MDM node (e.g., local primary MDM node 341) maintains a respective local MDM repository which is replicated to the other local MDM nodes (e.g., local secondary MDM node 342) in the respective local management subsystem. In each local management subsystem, the respective local MDM repository comprises metadata that is needed for the local primary MDM node to perform its respective management functions for the given subcluster of storage nodes. In other words, the local MDM repositories of the respective local management subsystems are utilized to maintain and manage pertinent metadata for managing the respective subcluster, and do not include full copy of the global metadata that is maintained in the global MDM repository. This serves to reduce the memory footprint needed to maintain the local MDM repositories. The global primary MDM node 331 can provide any relevant metadata to the local primary MDM nodes, on a need-to-know basis, to implement functions such as remote replication, inter-subcluster migrations, security functions, etc.

In each subcluster of storage nodes (e.g., each protection domain), the local primary MDM node (e.g., local primary MDM node 341) is responsible for managing and communicating with the various software components of the storage control systems 320 (e.g., SDS 322, SDT 324, SDR 326, etc.) of the storage nodes within the subcluster. For example, the local primary MDM node 341 is responsible for managing and communicating with the SDS 322, SDT 324, and SDR 236 components of the storage control systems 320 of the storage nodes 310-4, 310-5, 310-6, 310-7, etc., in the subcluster 311. The local primary MDM node 341 is responsible for updating the global primary MDM node 331 with information regarding changes which are relevant for the client drivers, e.g., the SDC 240 and the NVMe initiator 250 components.

In addition, the local primary MDM node of a given subcluster (e.g., protection domain) is responsible for management operations such as, e.g., maintaining full data protection within the given subcluster, controlling volume migration within the given subcluster (e.g., intra-PD migration), controlling rebalance operations within the given subclusters, managing asynchronous replication operations that are performed by the given subcluster to remote systems (e.g., the remote replication-enabled storage system 360), etc.

While FIG. 3 illustrates a high-availability solution for the global management system and local management subsystems, which is implemented using a 3-node MDM cluster, in other embodiments, the global management system and local management subsystems can be implemented using a 5-node MDM cluster. With a 5-node redundant management node configuration, assuming there are N subclusters (e.g., N protection domains) with each subcluster managed by local MDM subsystem comprising 5 MDM nodes (e.g., one local primary MDM node, two local secondary MDM nodes, and two local tiebreaker MDM nodes), the storage environment would include (i) 5*N local MDM nodes deployed on 5*N server nodes of the storage system, and (ii) 5 global nodes deployed on 5 other server nodes of the storage system, such as schematically illustrated in FIG. 4.

Figure 4:
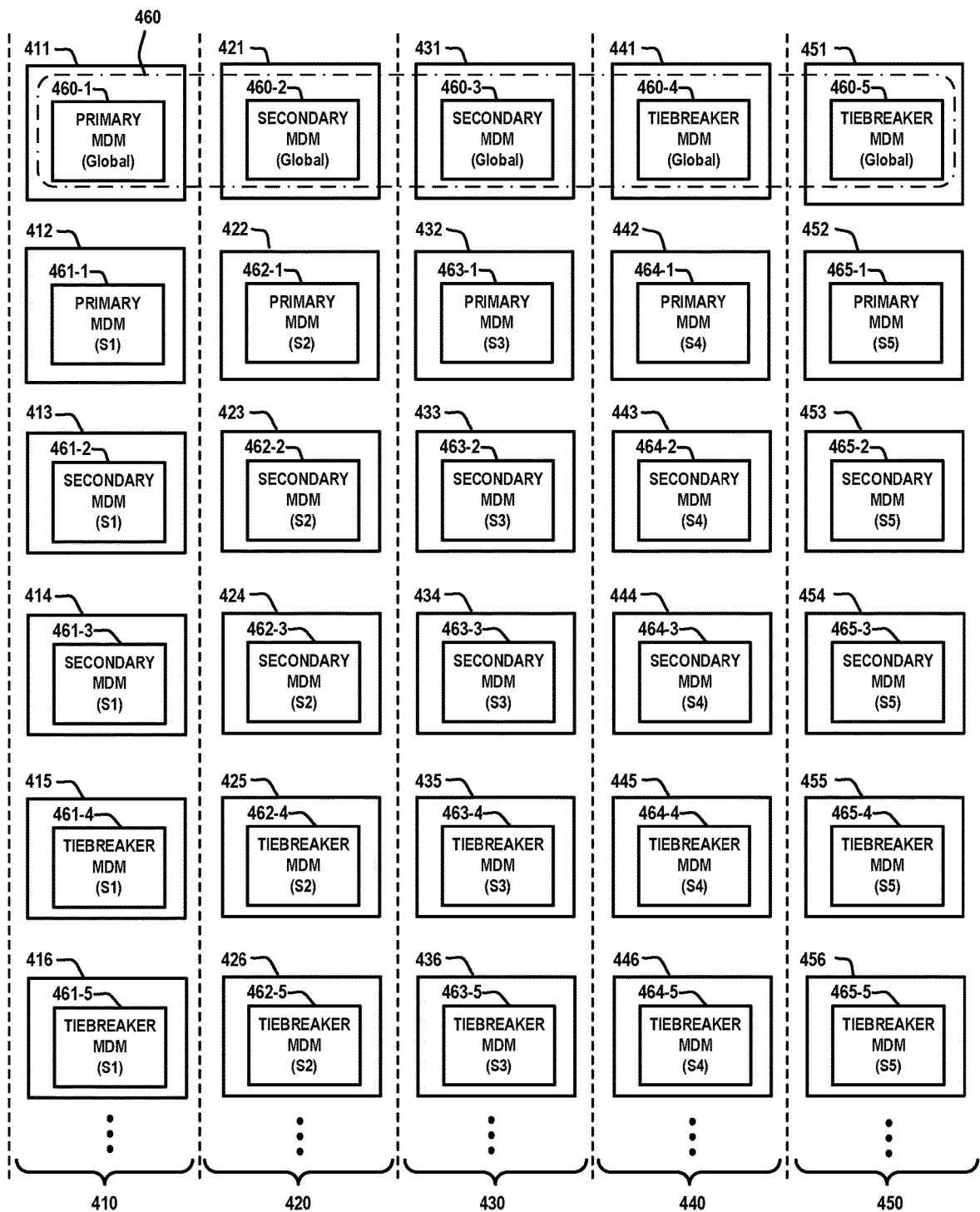
FIG. 4 schematically illustrates a data storage system which implements a distributed hierarchical cluster management system, according to another exemplary embodiment of the disclosure.

For example, FIG. 4 schematically illustrates a data storage system which implements a distributed hierarchical cluster management system, according to another exemplary embodiment of the disclosure. In particular, FIG. 4 schematically illustrates a software-defined storage environment 400 which comprises a plurality of subclusters of storage nodes including at least five subclusters 410, 420, 430, 440, and 450. In some embodiments, each subcluster 410, 420, 430, 440, and 450 represents a different protection domain with a unique set of storage nodes.

The subcluster 410 comprises a plurality of storage nodes 411, 412, 413, 414, 415, 416, etc. The subcluster 420 comprises a plurality of storage nodes 421, 422, 423, 424, 425, 426, etc. The subcluster 430 comprises a plurality of storage nodes 431, 432, 433, 434, 435, 436, etc. The subcluster 440 comprises a plurality of storage nodes 441, 442, 443, 444, 445, 446, etc. The subcluster 450 comprises a plurality of storage nodes 451, 452, 453, 454, 455, 456, etc. While the exemplary embodiment of FIG. 4 depicts 5 subclusters for ease of illustration, it is to be understood that the software-defined storage environment 400 can have more than five subclusters of storage nodes (e.g., more than 5 protection domains).

As further shown in FIG. 4, the storage nodes 411, 421, 431, 441, and 451 host respective global MDM nodes of a global management system 460, including a global primary MDM node 460-1, a first global secondary MDM node 460-2, a second global secondary MDM node 460-3, a first global tiebreaker MDM node 460-4, and a second global tiebreaker MDM node 460-5. In this exemplary embodiment, the global MDM nodes of a global management system 460 are distributed over the subclusters 410, 420, 430, 440, and 450. In the exemplary embodiment of FIG. 4 having five subclusters 410, 420, 430, 440, and 450, each subcluster includes one global MDM node of the global management system 460 (e.g., 5-node MDM cluster). In an exemplary embodiment having N subclusters (e.g., protection domains) where N>5, the five MDM nodes of the global management system 460 would be distributed over 5 of the N subclusters, while the other subclusters would not include a storage node having an active MDM node.

However, in some embodiments, to implement a high availability and dynamic solution, most or all storage nodes within the storage environment can have MDM nodes deployed thereon which initially serve as "standby MDM nodes" that are not active MDM nodes of the global MDM cluster and local MDM subclusters. When needed, a standby MDM can be called on to assume the position of a manager MDM node (e.g., primary or secondary MDM node) or a tiebreaker MDM node (according to how the MDM node was installed) when the standby MDM node is promoted to be a cluster member.

Further, the first subcluster 410 comprises a first local management subsystem S1 comprising a local primary MDM node 460-1, a first local secondary MDM node 461-2, a second local secondary MDM node 461-3, a first local tiebreaker MDM node 461-4, and a second local tiebreaker MDM node 461-5 which are deployed on respective storage nodes 412, 413, 414, 415, and 416 of the first subcluster 410. The second subcluster 420 comprises a second local management subsystem S2 comprising a local primary MDM node 462-1, a first local secondary MDM node 462-2, a second local secondary MDM node 462-3, a first local tiebreaker MDM node 462-4, and a second local tiebreaker MDM node 462-5 which are deployed on respective storage nodes 422, 423, 424, 425, and 426 of the second subcluster 420. The third subcluster 430 comprises a third local management subsystem S3 comprising a local primary MDM node 463-1, a first local secondary MDM node 463-2, a second local secondary MDM node 463-3, a first local tiebreaker MDM node 463-4, and a second local tiebreaker MDM node 463-5 which are deployed on respective storage nodes 432, 433, 434, 435, and 436 of the third subcluster 430. The fourth subcluster 440 comprises a fourth local management subsystem S4 comprising a local primary MDM node 464-1, a first local secondary MDM node 464-2, a second local secondary MDM node 464-3, a first local tiebreaker MDM node 464-4, and a second local tiebreaker MDM node 464-5 which are deployed on respective storage nodes 442, 443, 444, 445, and 446 of the fourth subcluster 430. The fifth subcluster 450 comprises a fifth local management subsystem S5 comprising a local primary MDM node 465-1, a first local secondary MDM node 465-2, a second local secondary MDM node 465-3, a first local tiebreaker MDM node 465-4, and a second local tiebreaker MDM node 465-5 which are deployed on respective storage nodes 452, 453, 454, 455, and 456 of the fifth subcluster 450.

FIG. 4 schematically illustrates an exemplary distributed hierarchical cluster management system in which the local management subsystems S1, S2, S3, S4, and S5 are configured to manage the storage nodes within the respective subclusters 410, 420, 430, 440, and 450, and report to the global management system 460. The global primary MDM node 460-1 and the local primary MDM nodes 461-1, 462-1, 463-1, 464-1, and 465-1 have respective management responsibilities as discussed above. For example, in some embodiments, the global primary MDM node 460-1 will communicate with only the local primary MDM nodes 461-1, 462-1, 463-1, 464-1, and 465-1, and not communicate with the various software components (e.g., SDSs, SDTs, SDRs, etc.) that are deployed on the storage nodes of the subclusters 410, 420, 430, 440, and 450. Instead, the local primary MDM nodes 461-1, 462-1, 463-1, 464-1, and 465-1 will communicate with the various software components (e.g., SDSs, SDTs, SDRs, etc.) that are deployed on the storage nodes of the respective subclusters 410, 420, 430, 440, and 450 to obtain status updates, and the local primary MDM nodes 461-1, 462-1, 463-1, 464-1, and 465-1 will report the status updates to the global primary MDM nodes 460-1. For a given subcluster comprising S storage nodes, this scheme reduces the communication/traffic from the given subcluster to the global primary MDM node from S nodes to the single node which implements the local primary MDM node of the local management subsystem of the give subcluster.

While the exemplary embodiment of FIG. 4 depicts each subcluster 410, 420, 430, 440, and 450 having six (6) storage nodes for ease of illustration, it is to be understood that each subcluster 410, 420, 430, 440, and 450 in the software-defined storage environment 400 can have more than six (6) storage nodes. Moreover, the total number of storage nodes in each subcluster can be the same or different, as needed. For example, in an exemplary embodiment, each subcluster 410, 420, 430, 440, and 450 can have 20 storage nodes, where 5 of the 20 nodes in each subcluster are assigned local MDM subsystem roles. However, in another embodiment, each subcluster 410, 420, 430, 440, and 450 can have a different number of storage nodes, e.g., 8 nodes, 20 nodes, 24 nodes, 50 nodes, 38 nodes, etc. The subcluster size is not statically defined or mandated, rather the subcluster size is user configurable as desired or needed for a given application.

Moreover, while the exemplary embodiment of FIG. 4 shows a cluster of storage nodes having multiple subclusters, wherein each subcluster includes a local management subsystem comprising a redundant 5-node MDM cluster, it is to be understood that that number of MDM nodes in each of the subclusters can vary, depending on the system configuration. For example, in a given storage node cluster comprising multiple subclusters with respective local management subsystems, one or more subclusters can have a 5-node MDM cluster, one or more subclusters can have a 3-node MDM cluster, and/or one or more subclusters can have a single-node MDM cluster (i.e., only one primary MDM node and no secondary or tiebreaker MDM nodes).

In some embodiments, a distributed hierarchical cluster management system can be implemented using different deployment solutions to ensure high availability in a large-scale software-defined storage environment including a static solution and dynamic solution. For example, with a static solution, two or more local management subsystems that are deployed in the storage environment can be assigned an additional role as a global management system. With this solution, one of the local MDM nodes that are utilized as secondary MDM nodes in the two or more local management subsystems can be promoted to a global primary MDM node of the global management system, if needed. In this case, an ownership switch can be performed where the ownership of the local secondary MDM node of a given local management subsystem is switched to the global management system, and where the ownership of the current global primary MDM node of the global management system is switched to the given local management subsystem.

Next, an exemplary dynamic solution would be to use all subsystem MDM nodes in a new clustered solution, with a much larger cluster, where the roles of secondary MDM node and tie-breaker MDM nodes are decided depending on the number of subsystems, where any MDM node in the a given local subsystem can become a global primary MDM node, with half of the nodes actually holding the MDM repository backup. The exemplary static and dynamic solutions allow the roles of the MDM nodes to be reallocated/changed depending on, for example, network availability, dynamic network path loss, reallocation of MDM roles based on available paths, or rebuild or rebalance operations that are occurring, etc. Any event that can adversely impact the availability and performance can result in the system can automatically changing the roles of MDM nodes, including global primary and local primary MDM roles, as needed, to ensure maximum availability.

Figure 5:
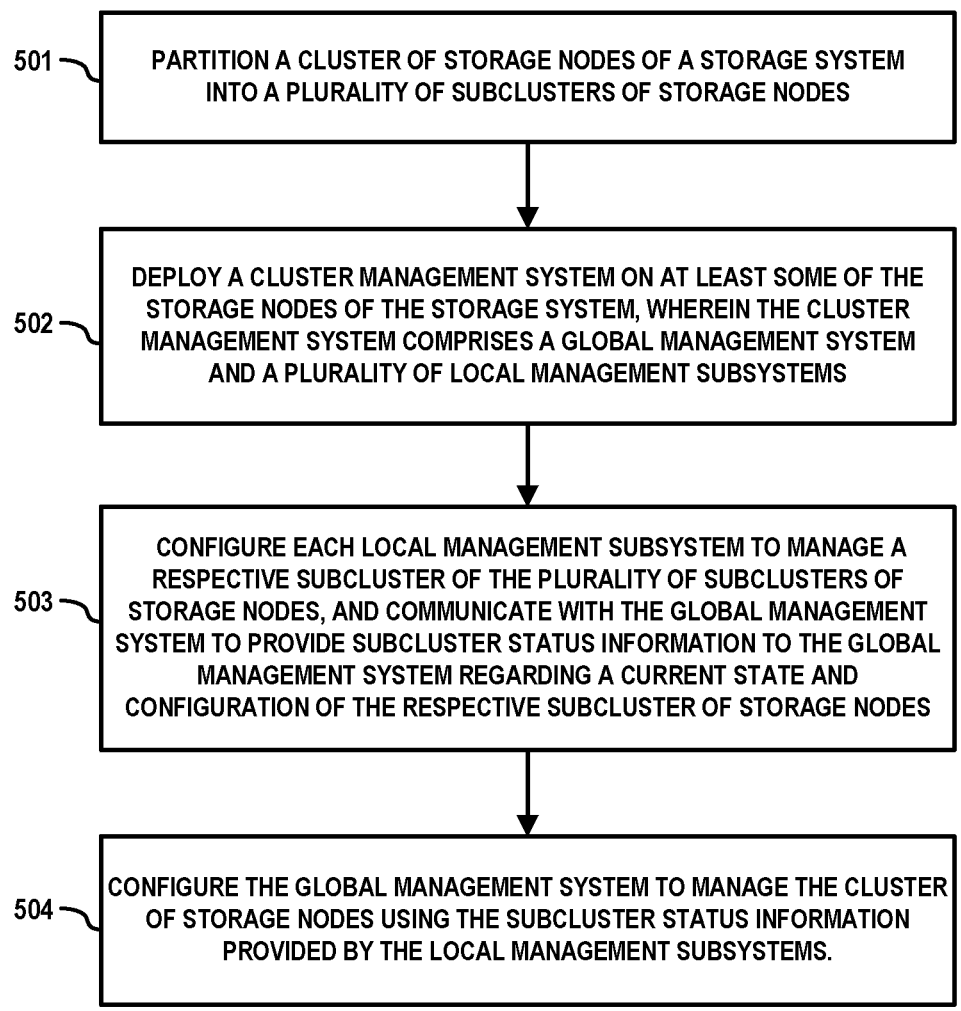
FIG. 5 illustrates a flow diagram of a method for implementing a hierarchical cluster management system for a data storage system, according to an exemplary embodiment of the disclosure.

FIG. 5 illustrates a flow diagram of a method 500 for implementing a hierarchical cluster management system for a data storage system, according to an exemplary embodiment of the disclosure. In some embodiments, the method 500 is implemented by an administrator using one or more software management clients or tools including, but not limited to, Command Line Interface (CLI), a storage system graphical user interface (GUI), a plug-in module with a wizard to deploy the storage environment, a REST application programming interface that is deployed on storage system gateway, etc.

Referring to FIG. 5, the method 500 comprises partitioning a cluster of storage nodes of a storage system into a plurality of subclusters of storage nodes (block 501). In some embodiments, as noted above, the cluster of storage nodes are logically partitioned into a plurality of protection domains. A next step comprises deploying a cluster management system on at least some of the storage nodes of the storage system, wherein the cluster management system comprises a global management system and a plurality of local management subsystems (block 502). Next, each local management subsystem is configured to manage a respective subcluster of the plurality of subclusters of storage nodes, and communicate with the global management system to provide subcluster status information to the global management system regarding a current state and configuration of the respective subcluster of storage nodes (bock 503). The global management system is configured to manage the cluster of storage nodes using the subcluster status information provided by the local management subsystems (block 504).

It is to be appreciated that the exemplary distributed hierarchical cluster management techniques as discussed herein effectively overcome the current scaling limitations of large-scale software-defined storage solutions which implement centrally managed cluster-based management solutions. Indeed, the exemplary distributed hierarchical cluster management techniques as discussed herein allow a large-scale software-defined storage environment to scale to thousands of nodes (e.g., 2048 nodes or more), while providing a significant reduction in network and CPU load of the server node hosting the global MDM node by, e.g., offloading subcluster specific activities (e.g., rebuild operations, rebalance operations, expansion operations, migration operations) to subsystem managers. In addition, when network path losses are detected, the distributed hierarchical cluster management system is configured to reallocate MDM roles based on available paths. In addition, dynamic reallocation of MDM roles can be triggered based on resource availability and network status, etc. The exemplary distributed hierarchical cluster management solutions described herein enable increased resource availability for the cluster managers for system wide activities, provide significant reduction in traffic to the global cluster manager (e.g., global primary MDM), and provide efficient role-based access control (RBAC) for defining roles of the MDM nodes of the global management system, and the MDM nodes of the e local management subsystems.

Figure 6:
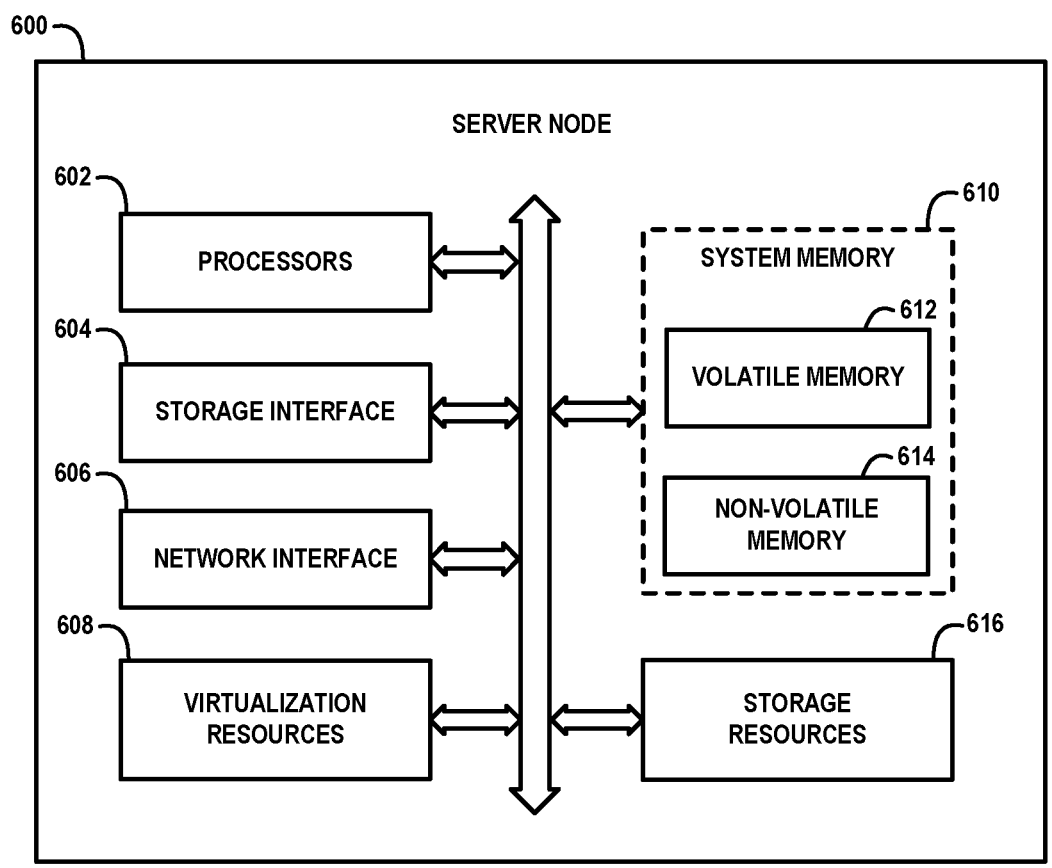
FIG. 6 schematically illustrates a framework of server node for hosting software components of scale out software-defined storage system and distributed hierarchical cluster management system, according to an exemplary embodiment of the disclosure.

FIG. 6 schematically illustrates a framework of server node for hosting software components of a scale out software-defined storage system and distributed hierarchical cluster management system, according to an exemplary embodiment of the disclosure. For example, FIG. 6 schematically illustrates an exemplary hardware/software configuration of, e.g., the storage nodes shown in the drawings. The server node 600 comprises processors 602, storage interface circuitry 604, network interface circuitry 606, virtualization resources 608, system memory 610, and storage resources 616. The system memory 610 comprises volatile memory 612 and non-volatile memory 614. The processors 602 comprise one or more types of hardware processors that are configured to process program instructions and data to execute a native operating system (OS) and applications that run on the server node 600.

For example, the processors 602 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 604 enables the processors 602 to interface and communicate with the system memory 610, the storage resources 616, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, SAS, Fibre Channel, etc. The network interface circuitry 606 enables the server node 600 to interface and communicate with a network and other system components. The network interface circuitry 606 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 608 can be instantiated to execute one or more services or functions which are hosted by the server node 600. For example, the virtualization resources 608 can be configured to implement the various modules and functionalities of a host connectivity management system as discussed herein. In one embodiment, the virtualization resources 608 comprise virtual machines that are implemented using a hypervisor platform which executes on the server node 600, wherein one or more virtual machines can be instantiated to execute functions of the server node 600. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 600, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 608 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 600 as well execute one or more of the various modules and functionalities of a storage control system as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the constituent software components of a software-defined storage system as describe herein are implemented using program code that is loaded into the system memory 610 (e.g., volatile memory 612), and executed by the processors 602 to perform respective functions as described herein. In this regard, the system memory 610, the storage resources 616, and other memory or storage resources as described herein, which have program code and data tangibly embodied thereon, are examples of what is more generally referred to herein as "processor-readable storage media" that store executable program code of one or more software programs. Computer program products which comprise a non-transitory processor-readable storage medium having stored therein program code of one or more software programs are considered embodiments of the disclosure. A processor-readable storage medium may comprise, for example, a storage device such as a storage disk, a storage array or an integrated circuit containing memory. The term "processor-readable storage medium" as used herein should be understood to exclude transitory, propagating signals.

The system memory 610 comprises various types of memory such as volatile RAM, NVRAM, or other types of memory, in any combination. The volatile memory 612 may be a dynamic random-access memory (DRAM) (e.g., DRAM DIMM (Dual In-line Memory Module), or other forms of volatile RAM. The non-volatile memory 614 may comprise one or more of NAND Flash storage devices, SSD devices, or other types of next generation non-volatile memory (NGNVM) devices. The system memory 610 can be implemented using a hierarchical memory tier structure wherein the volatile memory 612 is configured as the highest-level memory tier, and the non-volatile memory 614 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 602 to execute a native operating system and one or more applications or processes hosted by the server node 600, and to temporarily store data that is utilized and/or generated by the native OS and application programs and processes running on the server node 600. The storage resources 616 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A system, comprising:
 a data storage system comprising a cluster of storage nodes that is partitioned into a plurality of subclusters of storage nodes; and
 a cluster management system deployed on at least some of the storage nodes of the data storage system, wherein the cluster management system comprises a global management system and a plurality of local management subsystems;
 wherein each of the local management subsystems is configured to manage a respective subcluster of storage nodes of the plurality of subclusters of storage nodes independent of other ones of the local management subsystems, and is further configured to communicate with the global management system to provide subcluster status information to the global management system regarding a current state and configuration of the respective subcluster of storage nodes; and wherein the global management system is configured to manage the cluster of storage nodes using the subcluster status information provided by the local management subsystems.

2. The system of claim 1, wherein each subcluster of storage nodes of the plurality of subclusters of storage nodes comprises a logical protection domain.

3. The system of claim 1, wherein the global management system is configured to manage and communicate with client drivers of an application layer to provide connectivity information to the client drivers which enables the client drivers to connect to storage nodes of the cluster storage nodes and to access storage volumes of a virtual storage layer comprising aggregated storage capacity of the cluster of storage nodes.

4. The system of claim 1, wherein configuring each local management subsystem to manage a respective subcluster of storage nodes of the plurality of subclusters of storage nodes comprises configuring each local management subsystem to manage operations associated with the respective subcluster of storage nodes, wherein the operations include at least one of: managing a rebuild operation within the respective subcluster of storage nodes; managing a rebalance operation within the respective subcluster of storage nodes; adding a new storage node to the respective subcluster of storage nodes; removing an existing storage node from the respective subcluster of storage nodes; and performing a migration operation within the respective subcluster of storage nodes.

5. The system of claim 1, wherein:
the data storage system comprises a scale-out software-defined storage system comprising software components that are deployed on each storage node of the cluster of storage nodes to implement a storage control system on each storage node; and
each local management subsystem is configured to manage and communicate with the storage control systems of the storage nodes within the respective subclusters of storage nodes.

6. The system of claim 1, wherein:
the global management system comprises a cluster of global metadata manager (MDM) nodes deployed on different storage nodes of the data storage system, wherein the cluster of global MDM nodes comprises a global primary MDM node and at least one global secondary MDM node; and
the local management subsystem for a given subcluster of storage nodes comprises a cluster of local MDM nodes deployed on different storage nodes within the given subcluster of storage nodes, wherein the cluster of local MDM nodes comprises a local primary MDM node and at least one local secondary MDM node;
wherein the local primary MDM node of the local management subsystem communicates with the global primary MDM node of the global management system.

7. The system of claim 6, wherein the cluster management system is configured to cause a local secondary MDM node of a given cluster of local MDM nodes to assume a role of the global primary MDM node of the cluster of global MDM nodes.

8. The system of claim 6, wherein the cluster management system is configured to automatically reallocate an MDM role of one or more MDM nodes of one or more of the cluster of global MDM nodes and a given cluster of local MDM nodes, in response to detection, by the cluster management system, of an event that warrants the MDM role reallocation.

9. The system of claim 8, wherein the event comprises at least one of: detection of a loss of one or more network paths to one or more storage nodes; detection of congestion on one or more network paths; and reduced availability of storage or compute resources on one or more storage nodes on which the MDM nodes are deployed.

10. A method, comprising:
partitioning a cluster of storage nodes of a data storage system into a plurality of subclusters of storage nodes;
deploying a cluster management system on at least some of the storage nodes of the data storage system, wherein the cluster management system comprises a global management system and a plurality of local management subsystems;
configuring each of the local management subsystems to manage a respective subcluster of storage nodes of the plurality of subclusters of storage nodes independent of other ones of the local management subsystems, and to communicate with the global management system to provide subcluster status information to the global management system regarding a current state and configuration of the respective subcluster of storage nodes; and
configuring the global management system to manage the cluster of storage nodes using the subcluster status information provided by the local management subsystems.

11. The method of claim 10, wherein partitioning the cluster of storage nodes of the data storage system into the plurality of subclusters of storage nodes comprises logically partitioning the cluster of storage nodes into a plurality of protection domains.

12. The method of claim 10, further comprising configuring the global management system to manage and communicate with client drivers of an application layer to provide connectivity information to the client drivers which enables the client drivers to connect to storage nodes of the cluster of storage nodes and to access storage volumes of a virtual storage layer comprising aggregated storage capacity of the cluster of storage nodes.

13. The method of claim 10, wherein configuring each local management subsystem to manage a respective subcluster of storage nodes of the plurality of subclusters of storage nodes comprises configuring each local management subsystem to manage operations associated with the respective subcluster of storage nodes, wherein the operations include at least one of: managing a rebuild operation within the respective subcluster of storage nodes; managing a rebalance operation within the respective subcluster of storage nodes; adding a new storage node to the respective subcluster of storage nodes; removing an existing storage node from the respective subcluster of storage nodes; and performing a migration operation within the respective subcluster of storage nodes.

14. The method of claim 10, wherein deploying the cluster management system on at least some of the storage nodes of the data storage system comprises:
deploying a cluster of global metadata manager (MDM) nodes on different storage nodes of the data storage system to implement the global management system, wherein the cluster of global MDM nodes comprises a global primary MDM node and at least one global secondary MDM node; and deploying a cluster of local MDM nodes on different storage nodes within a given subcluster of storage nodes to implement a given local management subsystem for the given subcluster of storage nodes, wherein the cluster of local MDM nodes comprises a local primary MDM node and at least one local secondary MDM node;

wherein the local primary MDM node of the local management subsystem communicates with the global primary MDM node of the global management system.

15. The method of claim 14, further comprising configuring the cluster management system to cause a local secondary MDM node of a given cluster of local MDM nodes to assume a role of the global primary MDM node of the cluster of global MDM nodes.

16. The method of claim 15, further comprising configuring the cluster management system to automatically reallocate an MDM role of one or more MDM nodes of one or more of the cluster of global MDM nodes and a given cluster of local MDM nodes, in response to detection, by the cluster management system, of an event that warrants the MDM role reallocation;

wherein the event comprises at least one of: detection of a loss of one or more network paths to one or more storage nodes; detection of congestion on one or more network paths; and reduced availability of storage or compute resources on one or more storage nodes on which the MDM nodes are deployed.

17. A computer program product comprising a non-transitory processor-readable storage medium having stored therein program code of one or more software programs, wherein the program code when executed by at least one processing device causes the at least one processing device:

to partition a cluster of storage nodes of a data storage system into a plurality of subclusters of storage nodes;

to deploy a cluster management system on at least some of the storage nodes of the data storage system, wherein the cluster management system comprises a global management system and a plurality of local management subsystems;

to configure each of the local management subsystems to manage a respective subcluster of storage nodes of the plurality of subclusters of storage nodes independent of other ones of the local management subsystems, and to communicate with the global management system to provide subcluster status information to the global management system regarding a current state and configuration of the respective subcluster of storage nodes; and to configure the global management system to manage the cluster of storage nodes using the subcluster status information provided by the local management subsystems.

18. The computer program product of claim 17, further comprising program code to configure the global management system to manage and communicate with client drivers of an application layer to provide connectivity information to the client drivers which enables the client drivers to connect to the storage nodes and access storage volumes of a virtual storage layer comprising aggregated storage capacity of the cluster of storage nodes; and wherein the program code to configure each local management subsystem to manage a respective subcluster of storage nodes of the plurality of subclusters of storage nodes comprises program code to configure each local management subsystem to manage operations associated with the respective subcluster of storage nodes, wherein the operations include at least one of: managing a rebuild operation within the respective subcluster of storage nodes; managing a rebalance operation within the respective subcluster of storage nodes; adding a new storage node to the respective subcluster of storage nodes; removing an existing storage node from the respective subcluster of storage nodes; and performing a migration operation within the respective subcluster of storage nodes.

19. The computer program product of claim 18, wherein the program code to deploy the cluster management system on at least some of the storage nodes of the data storage system comprises program code to:

deploy a cluster of global metadata manager (MDM) nodes on different storage nodes of the data storage system to implement the global management system, wherein the cluster of global MDM nodes comprises a global primary MDM node and at least one global secondary MDM node; and deploy a cluster of local MDM nodes on different storage nodes within a given subcluster of storage nodes to implement a given local management subsystem for the given subcluster of storage nodes, wherein the cluster of local MDM nodes comprises a local primary MDM node and at least one local secondary MDM node;

wherein the local primary MDM node of the local management subsystem communicates with the global primary MDM node of the global management system.

20. The computer program product of claim 19, further comprising program code to configure the cluster management system to automatically reallocate MDM roles of one or more MDM nodes of one or more of the cluster of global MDM nodes and a given cluster of local MDM nodes, in response to detection, by the cluster management system, an event that warrants the MDM role reallocation, wherein the event comprises at least one of: detection of a loss of one or more network paths to one or more storage nodes; detection of congestion on one or more network paths; and reduced availability of storage or compute resources on one or more storage nodes on which the MDM nodes are deployed.

* * * * *